United States Patent
Kuli

(10) Patent No.: US 11,295,452 B1
(45) Date of Patent: Apr. 5, 2022

(54) AUTOMATED METHOD AND APPARATUS FOR DETECTING BLACK BORDERS IN AN IMAGE FRAME

(71) Applicant: Alphonso Inc., Mountain View, CA (US)

(72) Inventor: Pulak Kuli, Assam (IN)

(73) Assignee: ALPHONSO INC, Mountain View, CA (US)

( * ) Notice: Subject to any disclaimer, the term of this patent is extended or adjusted under 35 U.S.C. 154(b) by 0 days.

(21) Appl. No.: 17/477,171

(22) Filed: Sep. 16, 2021

(51) Int. Cl.
*G06T 7/13* (2017.01)
*G06T 7/136* (2017.01)

(52) U.S. Cl.
CPC .............. *G06T 7/13* (2017.01); *G06T 7/136* (2017.01); *G06T 2207/10016* (2013.01)

(58) Field of Classification Search
CPC .. G06T 7/13; G06T 7/136; G06T 2207/10016
See application file for complete search history.

(56) References Cited

U.S. PATENT DOCUMENTS

| | | | |
|---|---|---|---|
| 6,947,097 B1 | 9/2005 | Joanblanq | |
| 6,985,623 B2 | 1/2006 | Prakash et al. | |
| 8,498,487 B2 | 7/2013 | Singh et al. | |
| 9,060,106 B1 | 6/2015 | Wu et al. | |
| 2003/0185541 A1 | 10/2003 | Green | |
| 2013/0071034 A1* | 3/2013 | Kunkel | H04N 7/0122 382/199 |
| 2013/0094765 A1 | 4/2013 | Liu et al. | |
| 2015/0272546 A1* | 10/2015 | Cheon | A61B 8/5223 600/408 |
| 2017/0352100 A1 | 12/2017 | Shreve et al. | |
| 2018/0005387 A1* | 1/2018 | Lee | G06T 7/269 |
| 2020/0007924 A1 | 1/2020 | Wu et al. | |

FOREIGN PATENT DOCUMENTS

| | | | | |
|---|---|---|---|---|
| CN | 107464251 A | * | 12/2017 | |
| JP | 2008036882 A | * | 2/2008 | H04N 1/00031 |

OTHER PUBLICATIONS

Carreira et al. "Automatic Letter/Pillarbox Detection for Optimized Display of Digital TV." International Conference on Signal Processing and Multimedia Applications, Aug. 28, 2014, 8 pages (Year: 2014).*
English translation of JP2008036882A (Year: 2008).*
English translation of CN 107464251A (Year: 2017).*

(Continued)

*Primary Examiner* — Jon Chang
(74) *Attorney, Agent, or Firm* — Panitch Schwarze Belisario & Nadel LLP

(57) ABSTRACT

Black borders are detected in an image frame using a grey scale image of the image frame, and an edge image of the image frame. Candidate black borders are identified using maximum grey scale values associated with rows and columns of pixels of the grey scale image of the image frame, and then validated using a sum of grey scale values associated with rows and columns of pixels in the edge image of the image frame. If the validation fails, it is presumed that no black border exists.

30 Claims, 30 Drawing Sheets

290

START
↓
291 - Determine a maximum grey scale value of the pixels in each column of a grey scale image of an image frame
↓
292 - Detect candidate left and right black borders of the grey scale image
↓
293 - Determine a sum of grey scale values of the pixels in each column of an edge image of the image frame
↓
294 - Detect a potential left and right black border of the image frame using the sum of grey scale values for a column, and column locations thereof
↓
END

(56) References Cited

OTHER PUBLICATIONS

Demers et al., "What is the Aspect Ratio? (4:3, 16:9, 21:9)" Updated May 22, 2019, printout from: <https://www.rtings.com/tv/learn/what-is-the-aspect-ratio-4-3-16-9-21-9>, printout date: Jul. 16, 2019, 10 pages.
PHash: The open source perceptual hash library. Printout from phash.org, printout date: Aug. 18, 2021, Copyright © 2008-2010 Evan Klinger & David Starkweather, 3 pages.
Wikipedia entry for "Canny edge detector." Printout from web page: <https://en.wikipedia.org/wiki/Canny_edge_detector>, printout date: Jul. 19, 2021, last edited date: Jul. 15, 2021, original posting date: unknown, 10 pages.
Wikipedia entry for "Hamming distance" Printout from web page: <https://en.wikipedia.org/wiki/Hamming_distance>, printout date: Aug. 18, 2021, last edited date: Aug. 18, 2021, original posting date: unknown, 6 pages.
Wikipedia entry for "Minhash." Printout from web page: <https://en.wikipedia.org/wiki/MinHash>, printout date: Aug. 18, 2021, last edited date: Jul. 4, 2021, original posting date: unknown, 8 pages.

\* cited by examiner

290

START

↓

291 - Determine a maximum grey scale value of the pixels in each column of a grey scale image of an image frame

↓

292 – Detect candidate left and right black borders of the grey scale image

↓

293 – Determine a sum of grey scale values of the pixels in each column of an edge image of the image frame

↓

294 – Detect a potential left and right black border of the image frame using the sum of grey scale values for a column, and column locations thereof

↓

END

START

↓

301 - Determine a maximum grey scale value of the pixels in each row of a grey scale image of an image frame

↓

302 – Detect candidate top and bottom black borders of the grey scale image

↓

303 – Determine a sum of grey scale values of the pixels in each row of an edge image of the image frame

↓

304 – Detect a potential top and bottom black border of the image frame using the sum of grey scale values for a row, and row locations thereof

↓

END

Figure 30

AUTOMATED METHOD AND APPARATUS FOR DETECTING BLACK BORDERS IN AN IMAGE FRAME

BACKGROUND OF THE INVENTION

Video contents come in every shape and size. The same content may be available in multiple formats with respect to video quality attributes, such as aspect ratio, brightness, contrast, multi-color, and monochromatic. In theory, every version (or variant) of specific video content can be considered unique and different, but for all practical and commercial purposes, they all are same video content. For example, if a single commercial airing on two different channels with different aspect ratios is treated as two different commercials, then the spend analysis and/or attribution analysis would go haywire as the counts would get split between the two variants, even though it is a single commercial.

One attribute which can falsely create variants is the presence of one or more black borders on top, bottom, left and/or right edges. The border can be of any color, but mostly black color borders are added to the contents. Accordingly, it is necessary to accurately detect the presence of such black borders, as well as the boundaries thereof. Once the existence of black borders and their boundaries are known, the video content can be more accurately processed for variant analysis. Furthermore, there are applications other than variant detection of video content that require knowing whether black borders are present, and if so, what their boundaries are. For example, as described in U.S. Patent Application Publication No. 2020/0007924 (Wu et al.), it is known to insert secondary information, such as advertisements, into black border regions once their presence is detected.

While many prior art techniques exist to detect the presence and size (boundaries) of black borders, there is still a need in the art to improve the detection process and boundary determination process. The present invention fulfills such a need.

SUMMARY OF THE PRESENT INVENTION

Black borders are detected in an image frame using a grey scale image of the image frame, and an edge image of the image frame. Candidate black borders are identified using maximum grey scale values associated with rows and columns of pixels of the grey scale image of the image frame, and then validated using a sum of grey scale values associated with rows and columns of pixels in the edge image of the image frame. If the validation fails, it is presumed that no black border exists.

BRIEF DESCRIPTION OF THE DRAWINGS

Preferred embodiments of the present invention will now be described by way of example with reference to the accompanying drawings:

FIGS. 29 and 30 are flowcharts of preferred embodiments of the present invention.

DETAILED DESCRIPTION OF THE INVENTION

Figure 1:
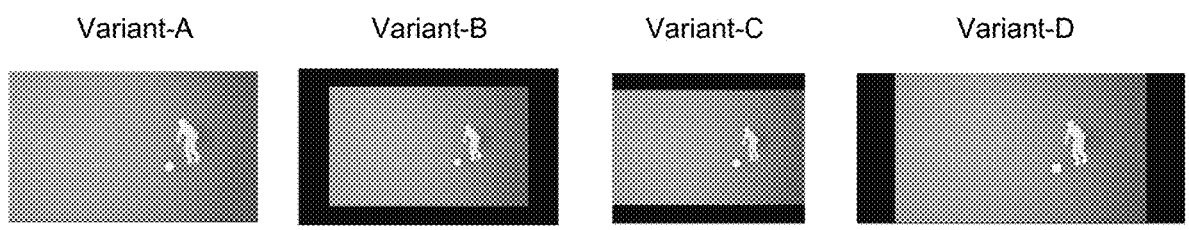
FIG. 1 shows variants of an image frame.

Certain terminology is used herein for convenience only and is not to be taken as a limitation on the present invention.

The words "a" and "an", as used in the claims and in the corresponding portions of the specification, mean "at least one."

I. DEFINITIONS

The following definitions are provided to promote understanding of the present invention.

video—"video" as discussed herein refers to a stream of video images, also referred to in the art as "image frames" "still image frames" of video. The stream of video images may be part of video content which may be program content or commercial (advertisement) content. Video includes audio and visual portions. However, the present invention is concerned only with the visual portions in the frames of the video.

black borders (black bars)—These borders appear on a TV screen when video content having its original version in a first format or aspect ratio is displayed on a TV screen that has a different format or aspect ratio. For example, when film or video that was not originally designed for widescreen is shown on a widescreen display, the original material is shrunk and placed in the middle of the widescreen frame with black borders filling the edges of the TV screen. Likewise, similar issues arise when video recorded for a conventional 4:3 aspect ratio is shown on a widescreen display, or when video recorded for a widescreen display is shown on TV screen having a 4:3 aspect ratio. The black borders are thus not part of the original video content (image content). Vertical black borders are black borders which appear on left (leftmost) and/or right (rightmost) edges of the video image frames, and horizontal black borders are black borders which appear on top (topmost) and/or bottom (bottommost) edges of the video image frames. Black borders on left and right edges have a predefined "width," whereas black borders on top and bottom edges have a predefined "height." Consequently, the video image content portion (i.e., portion of the image frame not including any black borders) also has a predefined width and height.

variant—One commonly accepted definition of "variant" is "a form or version of something that differs in some respect from other forms of the same thing or from a standard." (Oxford English Dictionary). A "variant" as defined herein is second video content of a second video that is identical to first video content of a first video (when comparing the second video to the first video) with respect to the video portion of the respective videos, wherein either the first or the second video has one or more black borders (black bars).

Thus, the "same thing" in the dictionary definition above refers to having the same (identical) video content in the context of the present invention. A "variant" as defined herein is thus also interchangeably referred to as a "content-identical variant." The variant (second video) may have the same aspect ratio as the first video, or it may have a different aspect ratio than the first video. Table 1 below illustrates non-exhaustive examples of second video that would be deemed to be a variant of first video, wherein the video content is identified as being identical:

TABLE 1

| first video | second video |
| --- | --- |
| 16:9 aspect ratio; no black border | 4:3 aspect ratio; top and bottom black borders |
| 16:9 aspect ratio; no black border | 16:9 aspect ratio; top, bottom, left, and right edge black borders |
| 16:9 aspect ratio; no black border | 21:9 aspect ratio; left and right edge black borders |
| 16:9 aspect ratio; top, bottom, left, and right edge black borders | 4:3 aspect ratio; top and bottom black borders |
| 16:9 aspect ratio; top, bottom, left, and right edge black borders | 16:9 aspect ratio; no black borders |
| 21:9 aspect ratio: no black border | 16:9 aspect ratio; top and bottom black borders |
| 21:9 aspect ratio: no black border | 4:3 aspect ratio; top and bottom black borders |

The first and second video may also be reversed in the examples above when identifying variants of one or the other. That is, when referring to variants, when a second video is identified as being a variant of a first video, the first video may be described as being a variant of the second video.

Consider, for example, FIG. 1 which illustrates four different variants of the same video content. Variant A has a 16:9 aspect ratio and no black border. Variant B also has a 16:9 aspect ratio, but includes top, bottom, left, and right edge black borders. Variant C has a 4:3 aspect ratio and includes top and bottom black borders. Variant D has a 21:9 aspect ratio and includes left and right edge black borders. automatic content recognition (ACR)—(also referred to as "automated content recognition) ACR refers to identification technology to recognize content played on a media device or present in a media file. ACR systems are used in many applications to identify media content in an A/V feed.

II. DETAILED DISCLOSURE

Preferred embodiments of the present invention exploit the following traits related to black borders in the images and videos:

i. The Black borders are rectangular in shape
  ii. The sides are parallel to the image
  iii. In video content (a commercial or program content), the black border either would be present in all frames or would be absent from all frames.

One preferred embodiment is implemented using the following steps:

Step 1: Compute Maximum Grey Scale Values

Treat the image (frame) as a matrix of rows and columns of pixels, with each pixel having an integer value representing the color it has. The integer value has a range [0, 255].

Figure 2:
FIG. 2 is a grey scale image for black border analysis.
Figure 3:
FIG. 3 is the image frame of FIG. 2 with overlaid columns of pixels for use in the black border analysis.

Consider the image frame (picture) shown in FIG. 2. FIG. 3 shows the picture of FIG. 2 with columns (Y-axis) of pixels.

Figure 4:
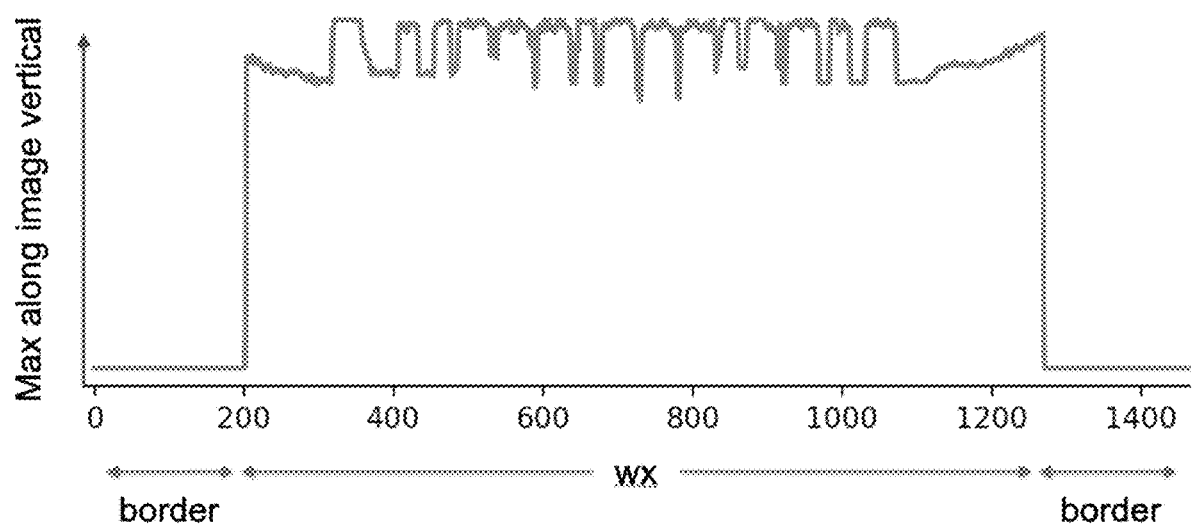
FIG. 4 is a graph of the maximum values in various columns of the image frame of FIG. 3.

Find a maximum grey scale value for any pixel in various columns and draw a graph. FIG. 4 depicts a graph of the maximum values in various columns (in each Y-axis).

Grayscale values of each pixel ranges from 0 to 255. Higher values mean brighter pixels. Hence, 0 means black and 255 means white. In one preferred implementation of this algorithm, any value less than 24 is considered to be a black pixel.

The graph of FIG. 4 clearly shows that the black border extends until x=200 on left edge and from x=1300 on right edge. These two values (200, 1300) form the candidate vertical borders of the image. Similarly, the candidate horizontal borders are obtained by repeating these steps for the complementary axis.

The graph of FIG. 4 also provides a value for "Wx," which is width of the image without any black borders on the edge. Similarly, when done across rows, a value is provided for "Wy," which is the height of the image without any black borders.

Thresholds are calculated for the vertical and the horizontal borders using the following formulas:

$$Ty = \text{Threshold } (=0.4) \times Wy \times 255$$

$$Tx = \text{Threshold } (=0.4) \times Wx \times 255$$

where,

Wx=width of the image without black borders as computed in Step 1.

Wy=height of the image without black borders as computed in Step 1.

Threshold=0.4 (could be found through trial and error) for the image data set being processed.

These thresholds are used later in step 4.

Step 2: Convert the Image to an Edge Image (Grey Scale Image), as Shown in FIG. 5.

The edge image of the image frame is created by performing edge detection on the image frame. In one preferred embodiment, the edge image is created using the well-known Canny edge algorithm. However, other edge detection operators may be used, such as the Sobel-Feldman operator, or the Laplacian of Gaussian operator. In the edge image, the pixel values are only 0 or 255 (black or white).

Step 3: Similar to Step 1, Compute Sum of Grey Scale Values for Each Column

Figure 5:
FIG. 5 is an edge image for the black border analysis.
Figure 6:
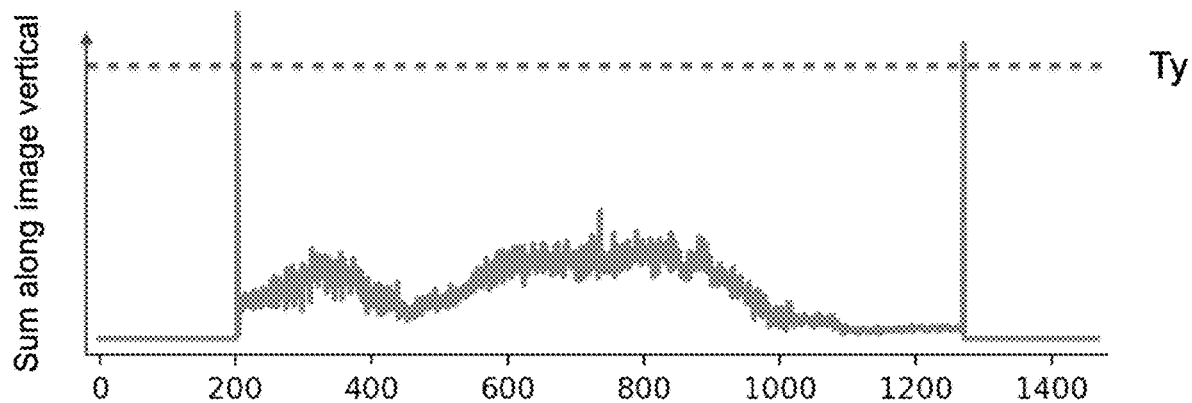
FIG. 6 is a graph of the sum of grey scale values for each column of the image in FIG. 5.

FIG. 6 depicts the data for the image of FIG. 5. This graph is plotted for both vertical and horizontal direction, i.e., rows and columns.

Step 4: Validate Candidate Borders Obtained from Step 1

(a) For finding vertical borders, find any peak crossing the threshold Ty, very close to the candidate borders. Closeness here means that the peak should be within a predefined image width of the candidate border. In one preferred embodiment, the peak should be within a candidate border–3% of image width and candidate border+3% of image width.

For example, if candidate vertical borders are 100 (indicating a black border on the left) and 900 (indicating a black border on the right), and the image width is 1000, then at least one peak crossing the threshold need to be within 100−3% of 1000 and 100+3% of 1000 to validate the candidate border 100. Similarly, at least one peak should be within 900−3% of 100 and 900+3% of 1000 to validate the candidate border 900.

(b) If there are any such peaks, then the candidate borders are valid and the image has black borders along the horizontal direction. The coordinates of the candidate borders can be used to determine the thickness of the left and the right black borders.

(c) Similarly for finding horizontal borders, find peaks crossing threshold Tx which are within a predefined image height of the candidate border. In one preferred embodiment, find peaks crossing threshold Tx which are within the candidate border−3% of image height and candidate border+3% of image height.

After performing these steps, one will know whether the image has black borders and also the thickness of the border on each of the four sides (top, left, bottom, and right).

Note: if the thickness of a black border is found to be too large (e.g., more than 20% of the image width), then the algorithm would declare that it is not the border, but the image possibly has black pixels (completely black image).

There are many scenarios where performing Step 1, without performing Steps 2-4, will result in an erroneous conclusion regarding the presence of black borders. Accordingly, preferred embodiments of the present invention make use of both a grey scale image of the image frame (Step 1), as well as an edge image of the image frame (Steps 2-4). Two examples are provided below which illustrates the importance of using both a grey scale image of the image frame and an edge image of the image frame.

Example 1: Images Fading into Black Around the Corners

Figure 7:
FIGS. 7-11 are images and graphs for illustrating a first example of black border detection.

Input: The video associated with the image frame shown in FIG. 7 should not be declared as containing a black border.

Figure 8:
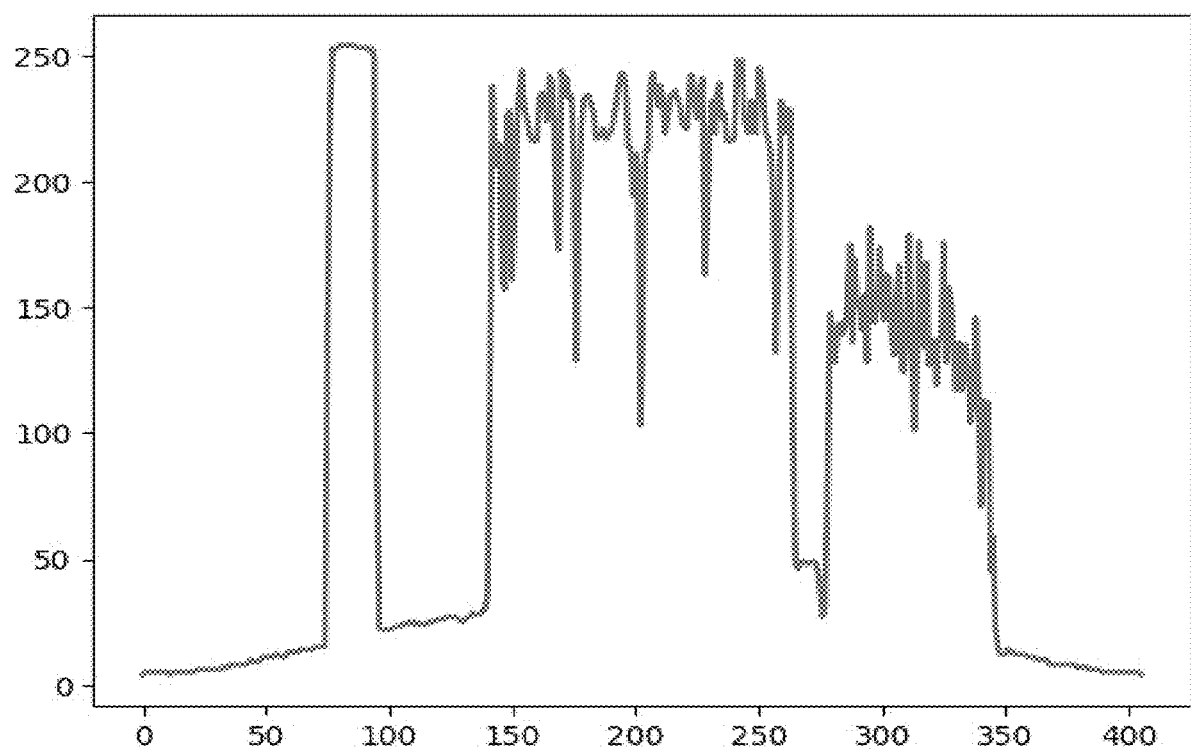

Step 1: The plot for maximum grayscale values across the vertical direction for each point in the horizontal direction, as shown in FIG. 8.

The candidate borders along the horizontal direction are (75, 345), because there are only black pixels (<24) to the left and right of this range. This implies that there might be a black border on the left from the 0th to the 75th pixel and a black border on the right from 345th to rightmost corner of the image.

The threshold Tx will be calculated as THRESHOLD×(non bordered image width)×255=0.4×(345−75+1)×255=27642.

Figure 9:
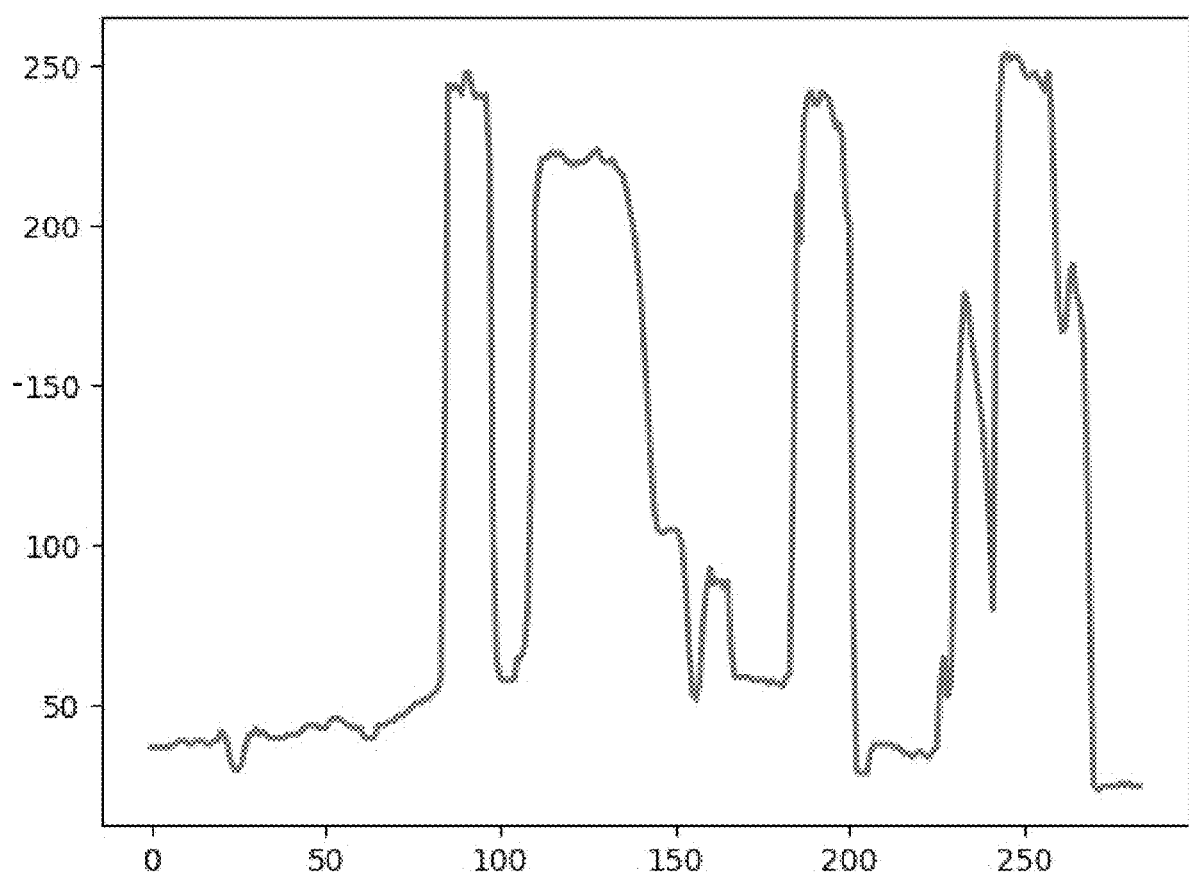

Similarly, FIG. 9 is a plot of maximum grayscale values along the complementary axis. The candidate border along this direction is (0, 283). Along this direction, the threshold Ty will be 0.4×(283−0+1)×255=28968.

Figure 10:

Step 2: Find the edges of the image. FIG. 10 is an edge image of the image frame.

Figure 11:
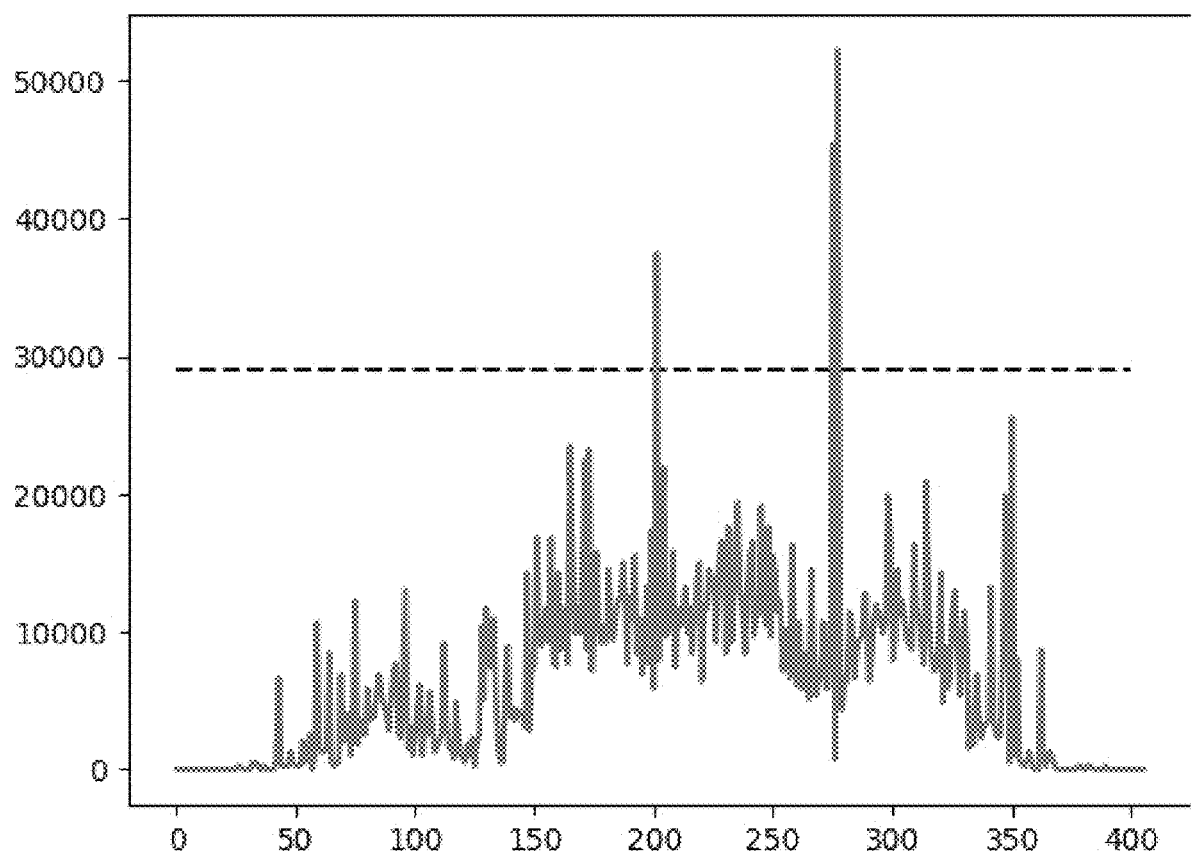

Step 3: Plot of sum along the vertical axis of the edges, as shown in FIG. 11.

Step 4: As shown in FIG. 11, there are no peaks crossing the threshold Ty (=28968) near the candidate borders 75 and 345. Intuitively, this is because there is no sharp transition in the given image around the candidate border coordinates. The candidate border along the other axis is also rejected in the same manner.

Result: Hence, this image will be rejected and marked as containing NO black border.

Example 2: Images with Only Text and a Black Background

Figure 12:
FIGS. 12-16 are images and graphs for illustrating a second example of black border detection.

Input: The video associated with the image frame shown in FIG. 12 should not be declared as containing a black border.

Figure 13:
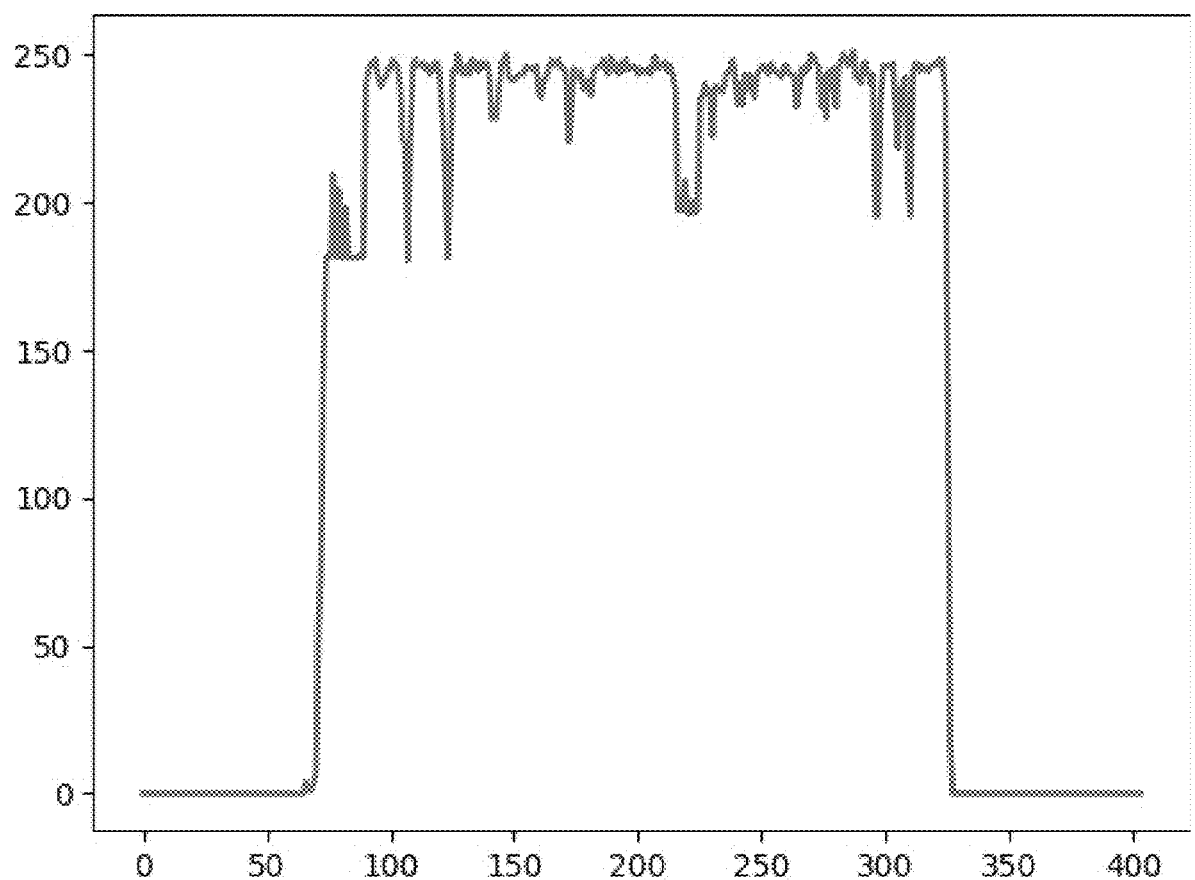

Step 1: The max plot along the vertical axis is shown in FIG. 13.

Candidate borders along the horizontal direction are (71, 325). Tx=0.4×(325−71+1)×255=26010.

Figure 14:
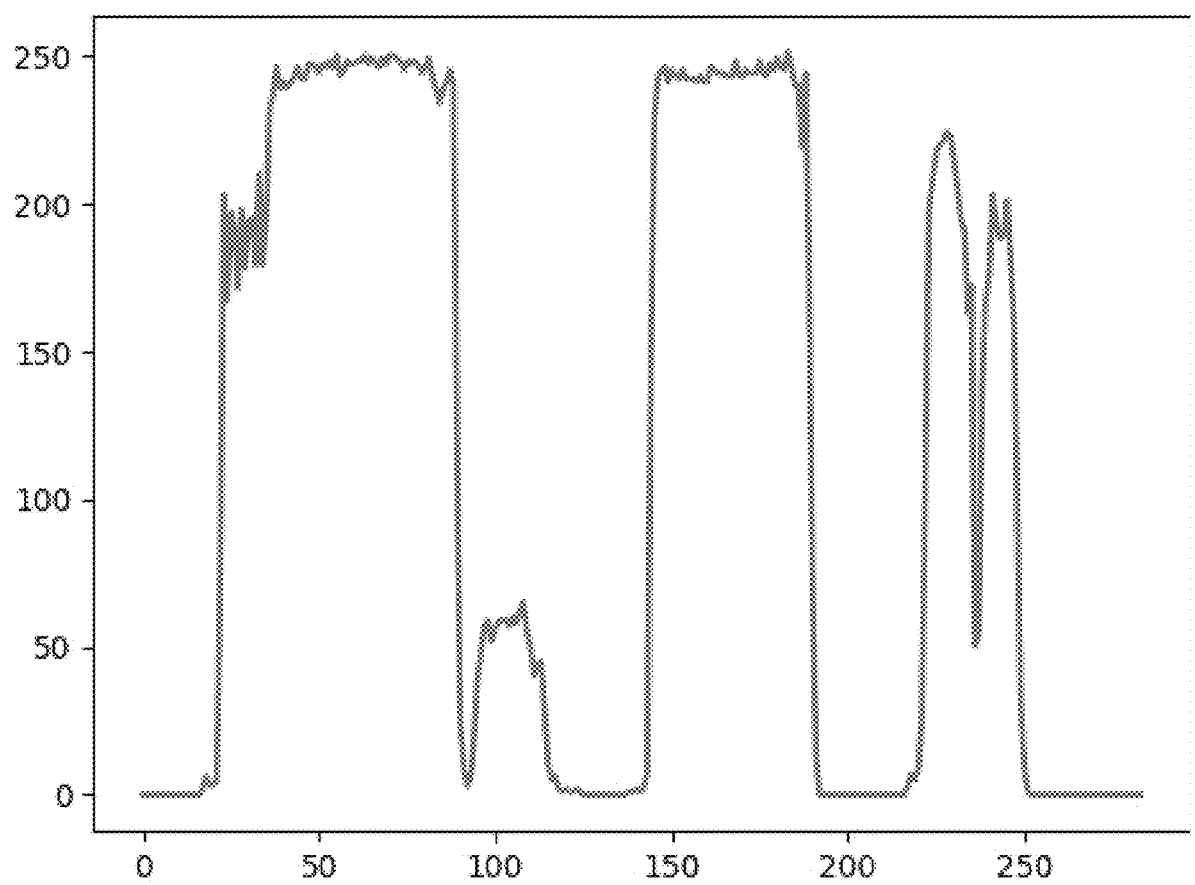

Similarly, the max plot along the complementary axis is shown in FIG. 14.

Candidate borders: (22, 249). Threshold Ty=0.4×(249−22+1)×255=23256.

Figure 15:

Step 2: Find the edges of the image. FIG. 15 is an edge image of the image frame.

Figure 16:
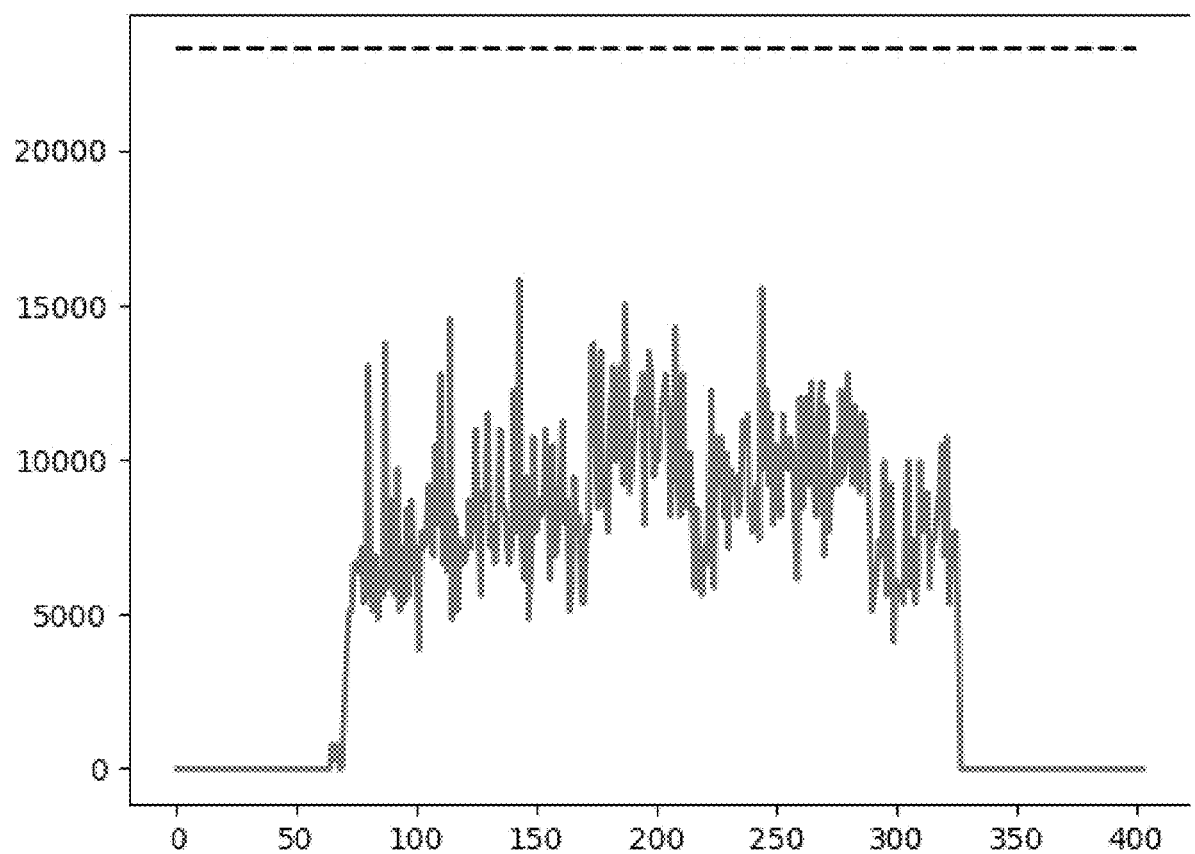

Step 3: Plot of the sum along the vertical axis of edges, as shown in FIG. 16.

Step 4: As clearly visible in FIG. 16, there are no peaks which cross the threshold Ty (=23256). Since the test failed, there is no need to check further along the other axis.

Result: This image does NOT contain a black border.

Two examples are provided below which illustrate images with black borders being identified correctly.

Figure 17:
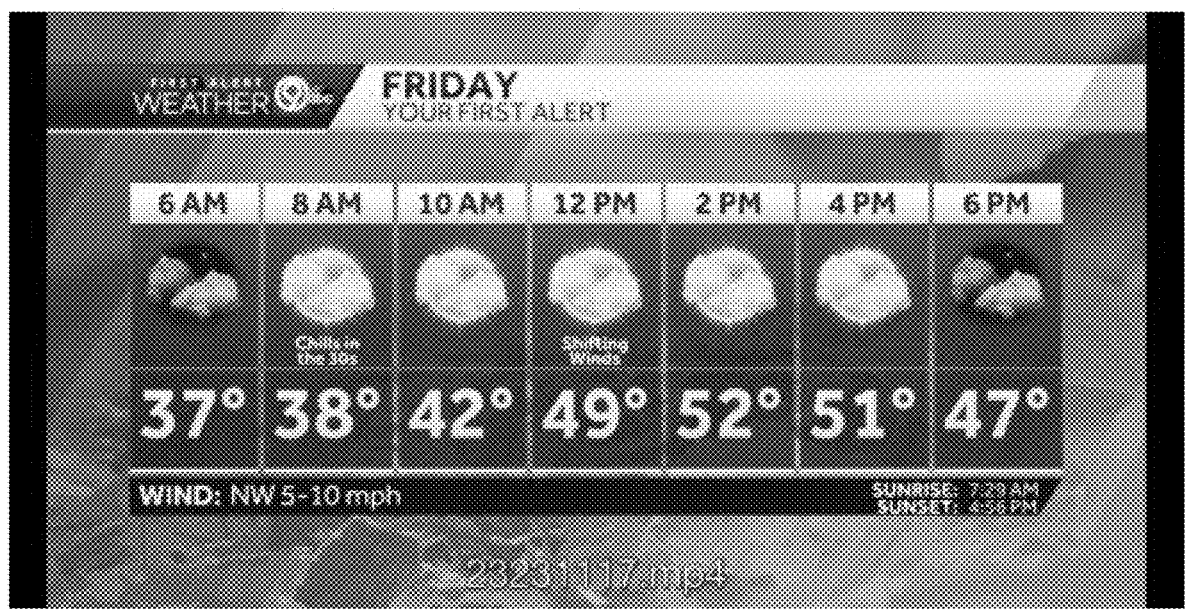
FIGS. 17-21 are images and graphs for illustrating a third example of black border detection.

Example 1: Weather program with black borders, as shown in FIG. 17.

Figure 18:
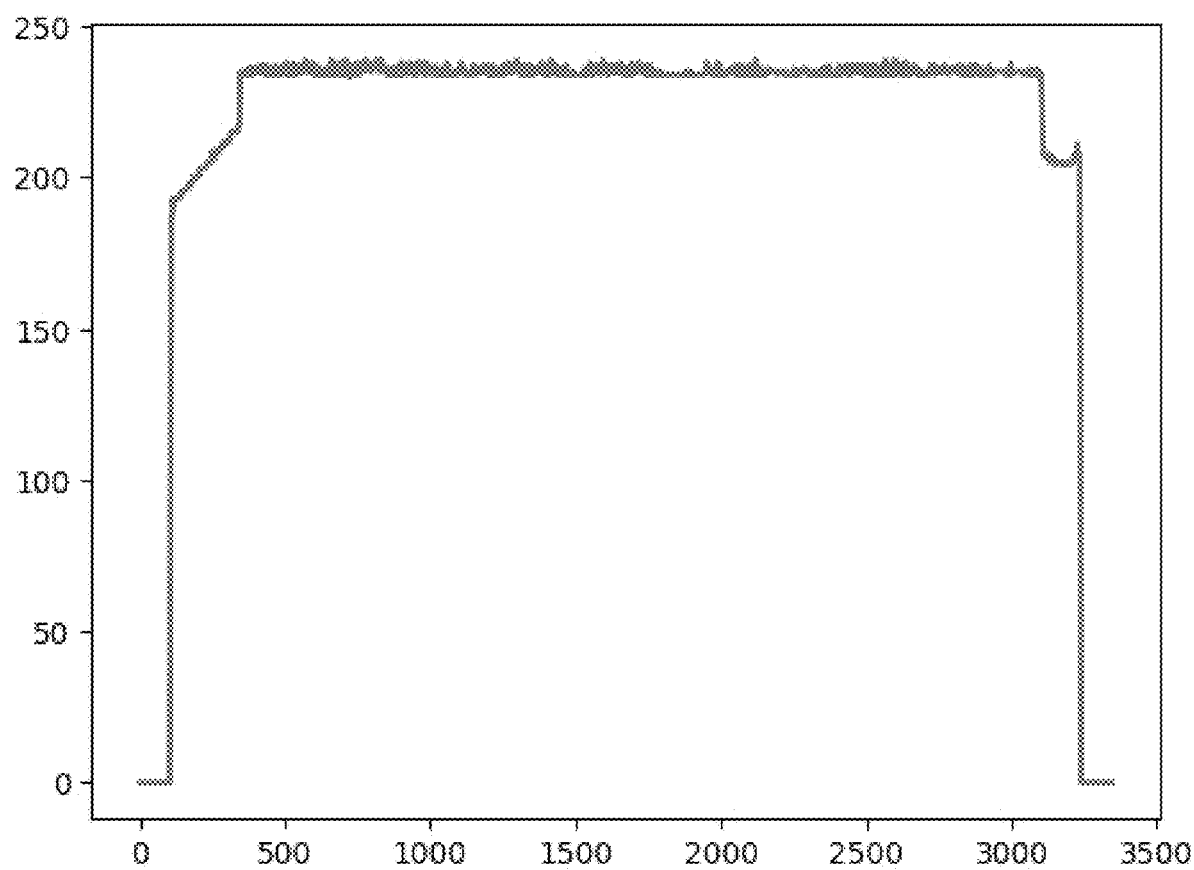

Step 1: Plot max values along vertical axis, as shown in FIG. 18.

Candidates vertical borders (along x axis): 104, 3239.

Figure 19:
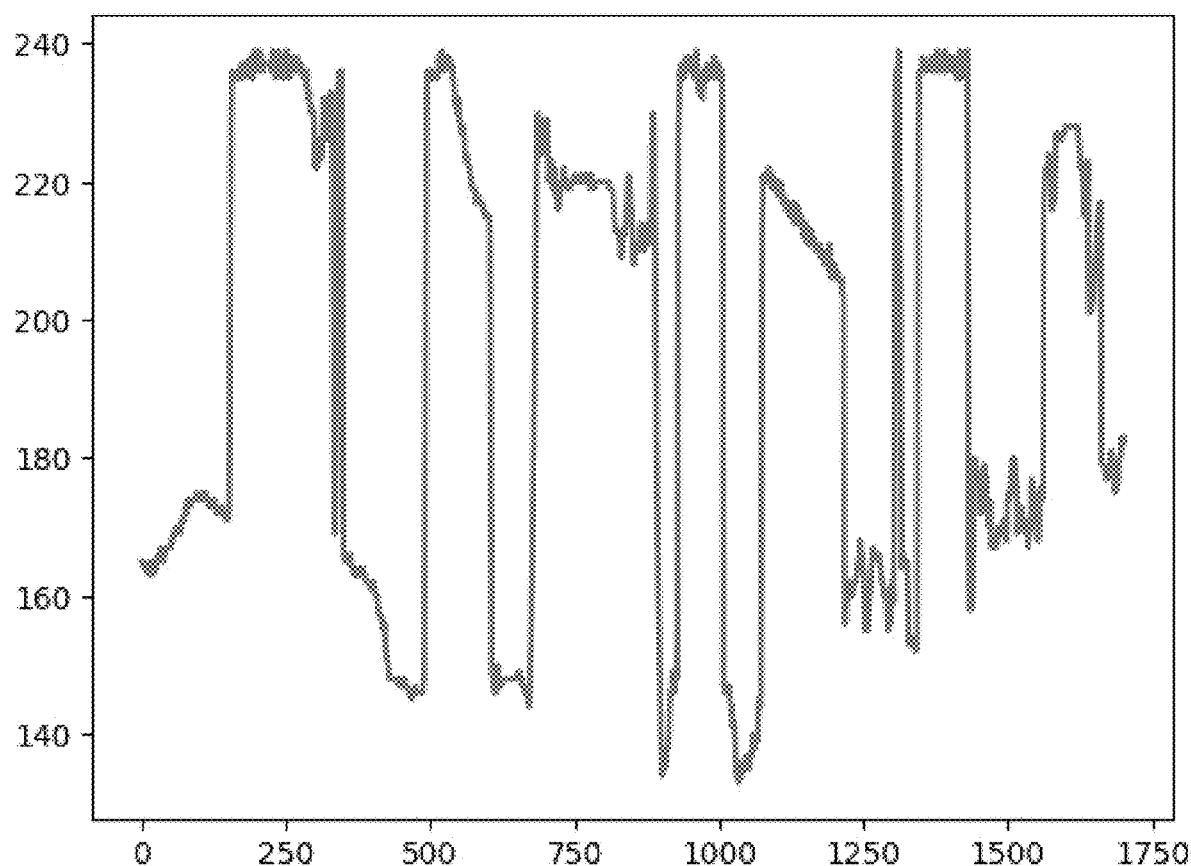

Plot of max values along horizontal axis, as shown in FIG. 19.

Clearly, there are no borders along this axis.

Figure 20:

Step 2: Find the edges of the image. FIG. 20 is an edge image of the image frame.

Figure 21:
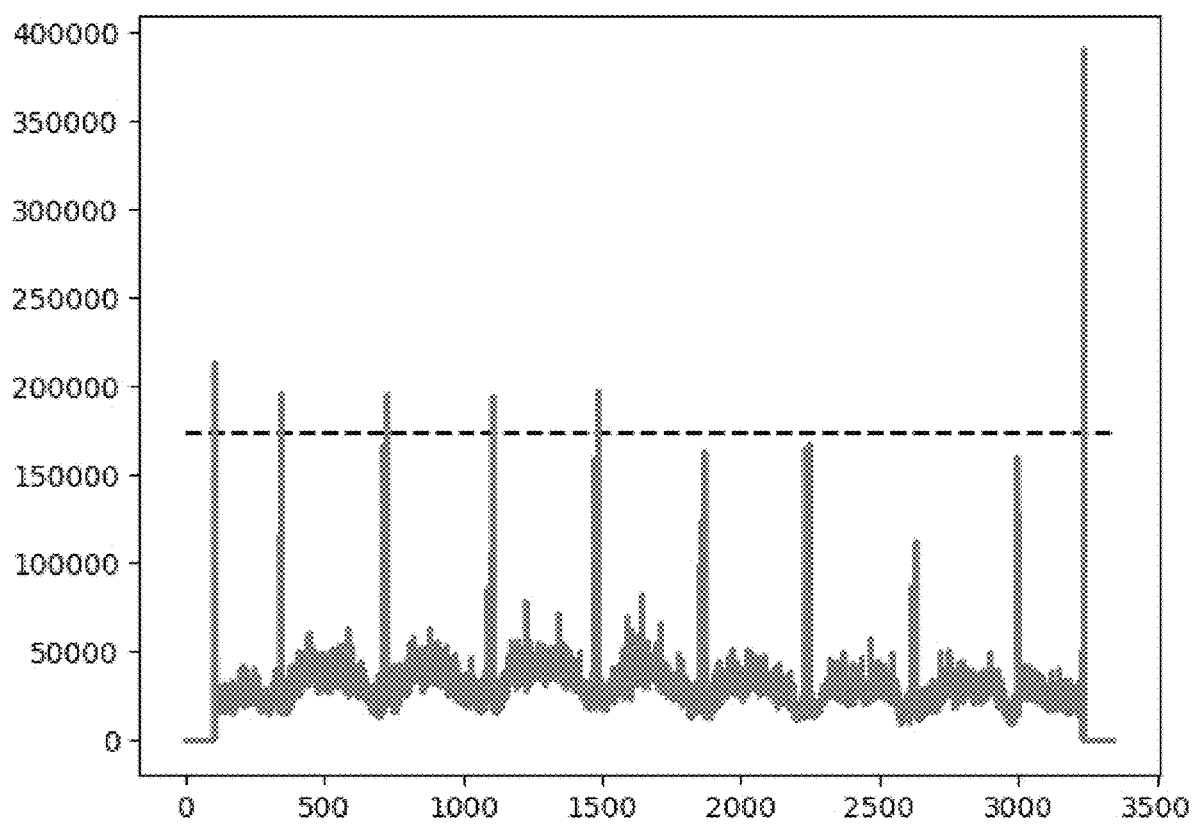

Step 3: Plot of the sum of edges along the vertical axis, as shown in FIG. 21.

Step 4: Peaks are present near candidate vertical borders 104 and 3239. No candidate borders along the other axis.

Result: Black border is present along the horizontal direction. Thickness of border on the left=104, thickness of border on the right=IMAGE_WIDTH−3239=106.

Figure 22:
FIGS. 22-27 are images and graphs for illustrating a fourth example of black border detection.

Example 2: Black Borders along both the axes, as shown in FIG. 22.

Figure 23:
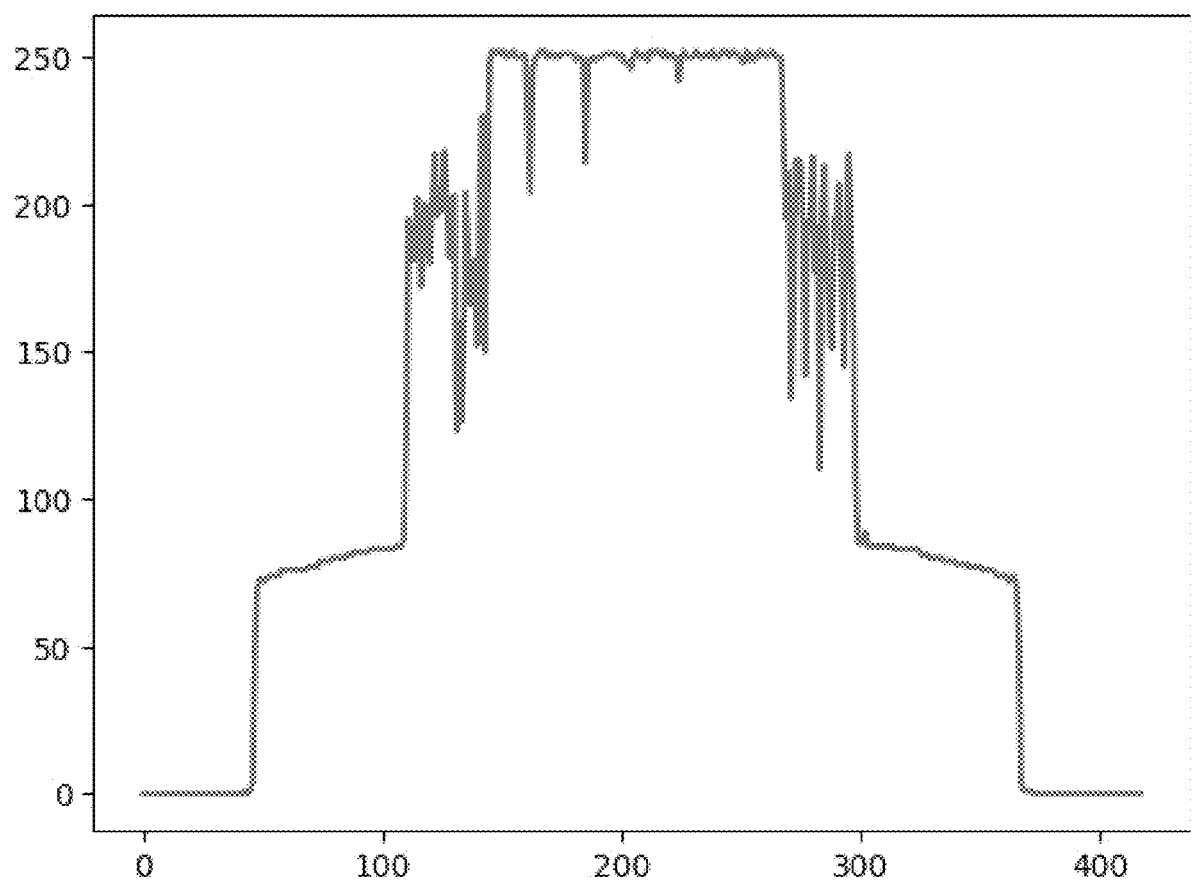

Step 1: Plot max values along vertical axis, as shown in FIG. 23.

Candidate vertical borders (along x axis): 47, 366.

Figure 24:
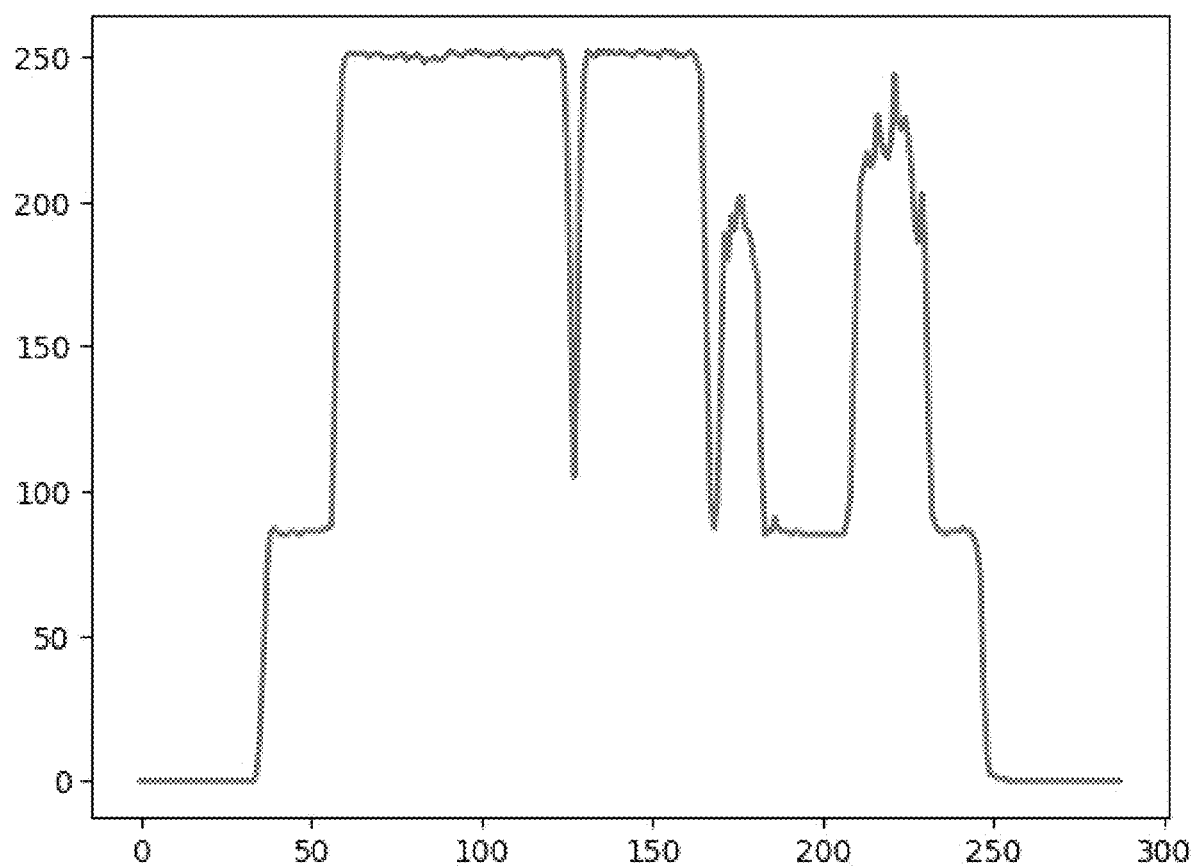

Plot max values along horizontal axis, as shown in FIG. 24.

Candidate horizontal borders (along y axis): 36, 247.

Figure 25:

Step 2: Find the edges of the image. FIG. 25 is an edge image of the image frame.

Figure 26:
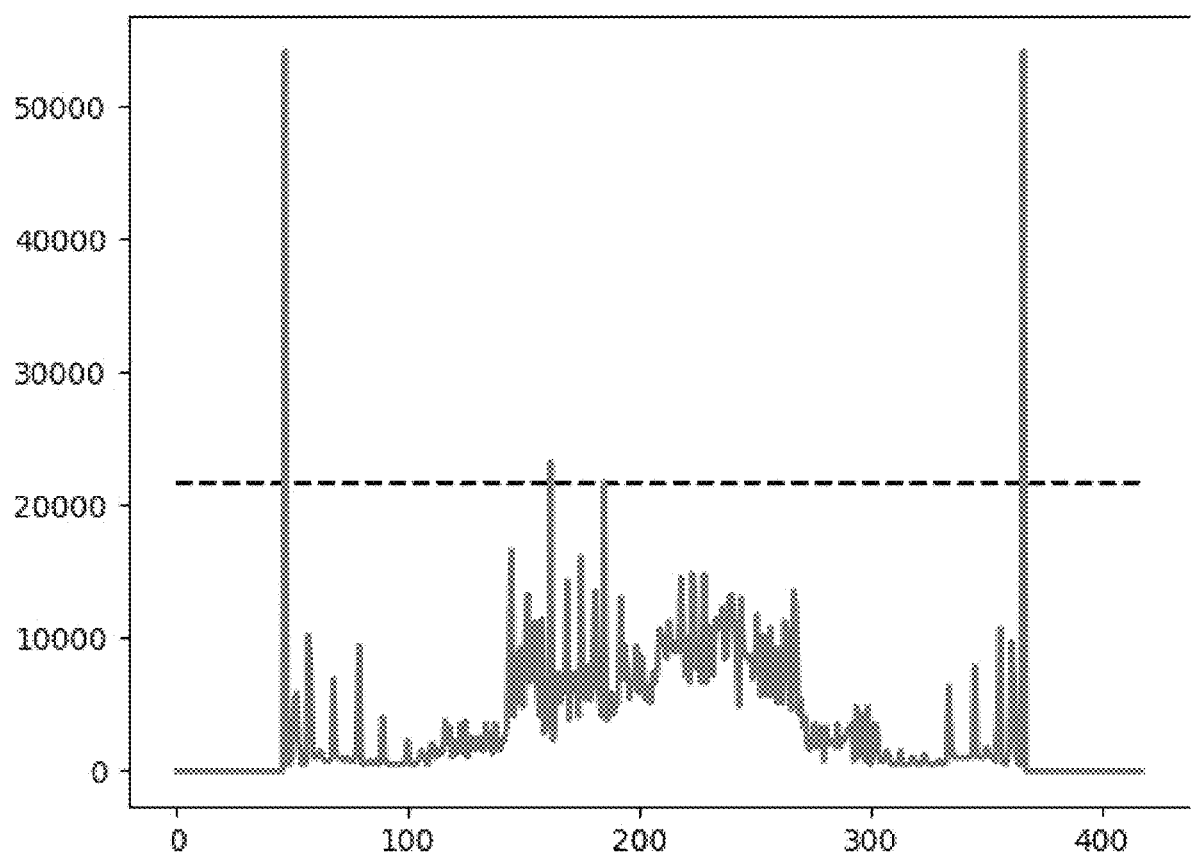

Step 3: Plot of sum of edges along vertical axis, as shown in FIG. 26.

Figure 27:
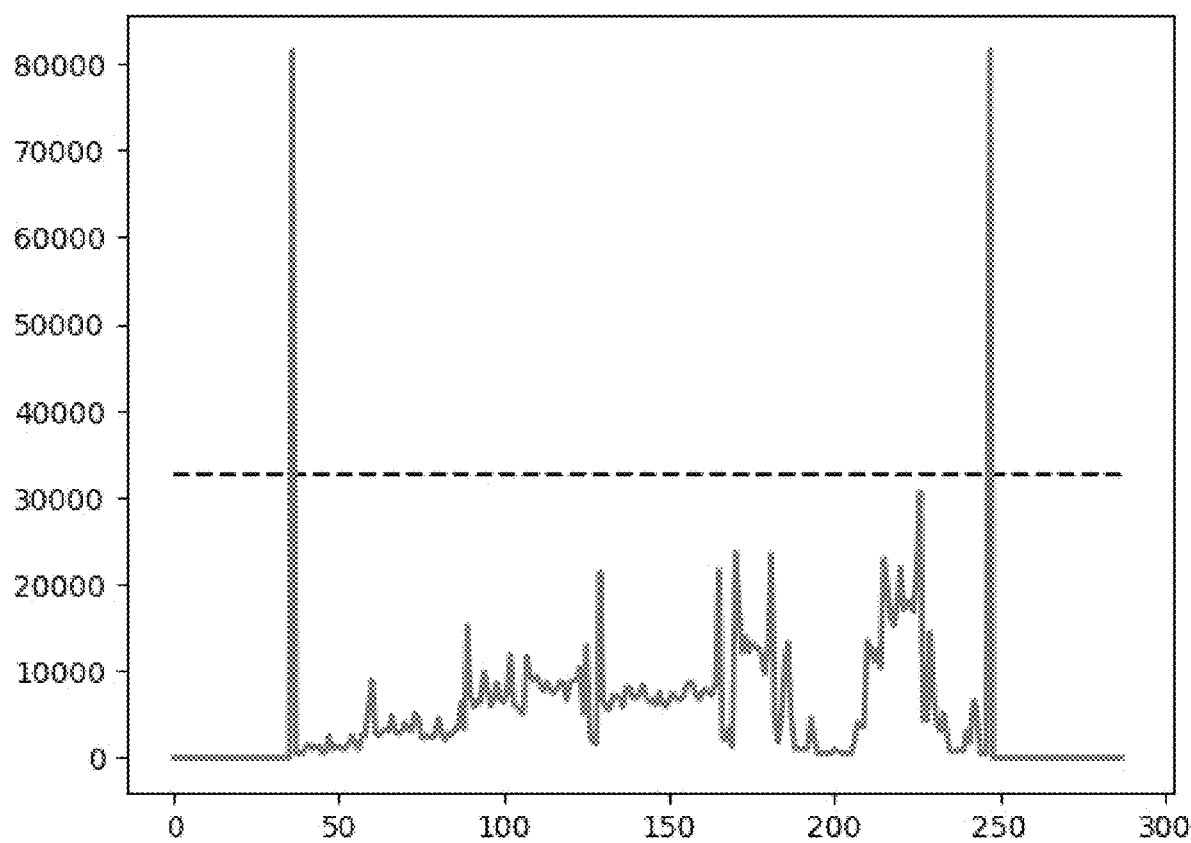

Plot of sum of edges along horizontal axis, shown in FIG. 27.

Step 4: Peaks are present near candidate vertical borders 47 and 366.

Peaks present near candidate horizontal borders 36 and 247.

Result: Black border is present along the vertical and horizontal direction. Thickness of border on the top=36, bottom=40, right=51, left=47.

Figure 28:
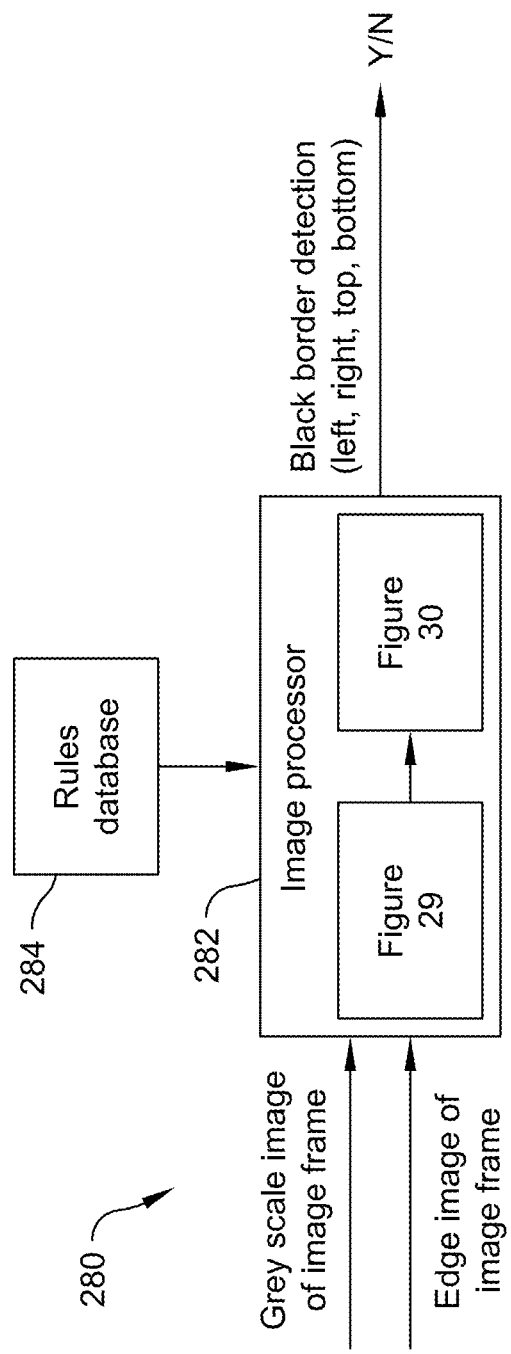
FIG. 28 is a schematic diagram of a system (apparatus) for implementing preferred embodiments of the present invention.

FIG. 28 is a schematic diagram of a system (apparatus) 280 for implementing one preferred embodiment of the present invention. The system 280 includes an image processor 282 which receives a grey scale and edge image of a video image frame for black border detection thereof and performs the functions described below with respect to FIGS. 29 and 30. Alternatively, the image processor 282 may receive the video, identify a suitable image frame for black border detection, and then create the grey scale and edge image of the image frame for processing. The system 280 also includes a rules database 284 for enhancing accuracy of the system 280, as also discussed below.

FIG. 29 is a flowchart of an automated method 290 for performing vertical black border detection, namely, detecting whether an image frame having image content therein includes a potential or likely left or right black border ("potential" and "likely" are used herein as synonymous concepts). The image frame is represented as a matrix of rows and columns of pixels. The columns have a leftmost column and a rightmost column. The potential left or right black borders each have a width. The image frame has an associated (i) grey scale image of the image frame, and (ii) edge image of the image frame. The method includes the following steps:

Step 291: Automatically determine, using the image processor 282, a maximum grey scale value of the pixels in each column of the grey scale image of the image frame. The grey scale value ranges from a lowest value which represents black to a highest value which represents white.

Step 292: Detect candidate left and right black borders of the grey scale image. More specifically, a candidate left black border is detected on a leftmost edge of the grey scale image of the image frame, using the image processor 282, when a plurality of consecutive columns beginning with the leftmost column have a black maximum grey scale value. The width of the candidate left black border is defined by the number of consecutive columns from the leftmost edge of the image frame that have a black maximum grey scale value. A candidate right black border is detected on a rightmost edge of the grey scale image of the image frame, using the image processor 282, when a plurality of consecutive columns beginning with the rightmost column have a black maximum grey scale value. The width of the potential right black border is defined by the number of consecutive columns from the rightmost edge of the image frame that have a black maximum grey scale value.

Step 293: Automatically determine, using the image processor 282, a sum of grey scale values of the pixels in each column of the edge image of the image frame.

Step 294: Detect a potential left and right black border of the image frame using the sum of grey scale values for a column, and column locations thereof. More specifically, a potential left black border is detected on a leftmost edge of the image frame, using the image processor 282, when the sum of grey scale values for a column exceeds a predetermined threshold value and the column is located within a predefined image width of the candidate left black border. A potential right black border is detected on a rightmost edge of the image frame, using the image processor 282, when the sum of grey scale values for a column exceeds the predetermined threshold value and the column is located within a predefined image width of the candidate right black border.

FIG. 30 is a flowchart of an automated method 300 for performing horizontal black border detection, namely, detecting whether an image frame having image content therein includes a potential or likely top or bottom black border. The image frame is represented as a matrix of rows and columns of pixels. The rows have a topmost row and a bottommost row. The potential top or bottom black borders each have a height. The image frame has an associated (i) grey scale image of the image frame, and (ii) edge image of the image frame. The method includes the following steps:

Step 301—Automatically determine, using the image processor 282, a maximum grey scale value of the pixels in each row of the grey scale image of the image frame. The grey scale value ranges from a lowest value which represents black to a highest value which represents white.

Step 302: Detect candidate top and bottom black borders of the grey scale image. More specifically, a candidate top black border is detected on a topmost edge of the grey scale image of the image frame, using the image processor 282, when a plurality of consecutive rows beginning with the topmost row have a black maximum grey scale value. The height of the potential top black border is defined by the number of consecutive rows from the topmost edge of the image frame that have a black maximum grey scale value. A candidate bottom black border is detected on a bottommost edge of the grey scale image of the image frame, using the image processor 282, when a plurality of consecutive rows beginning with the bottommost row have a black maximum grey scale value. The height of the potential bottom black border is defined by the number of consecutive rows from the bottommost edge of the image frame that have a black maximum grey scale value.

Step 303: Automatically determine, using the image processor 282, a sum of grey scale values of the pixels in each row of the edge image of the image frame.

Step 304: Detect a potential top and bottom black border of the image frame using the sum of grey scale values for a row, and row locations thereof. More specifically, a potential top black border on a topmost edge of the image frame is detected, using the image processor 282, when the sum of grey scale values for a row exceeds a predetermined threshold value and the row is located within a predefined image height of the candidate top black border. A potential bottom black border is detected on a bottommost edge of the image frame, using the image processor 282, when the sum of grey scale values for a row exceeds the predetermined threshold value and the row is located within a predefined image height of the candidate bottom black border.

III. ADDITIONAL CONSIDERATIONS

1. Image Rotation

Conceptually, the process for calculating horizontal black borders involves rotating the image frame by 90 degrees and then repeating the steps shown in the flowchart of FIG. 29 flowchart. Thus, the steps shown in the flowchart of FIG. 30 may be performed by merely performing this rotation, wherein rows become columns, and height becomes width.

2. Interrelationship Between Vertical and Horizontal Black Border Detection

While these processes are described separately, they are intertwined in preferred embodiments of the present invention. This is because if there is a horizontal black border, one should ideally account for that when selecting the predetermined threshold value for the sum of grey scale values in the edge image steps 293 and 294). Likewise, if there is a vertical black border, one should ideally account for that when selecting the predetermined threshold value for the sum of grey scale values in the edge image steps 303 and 304.

Referring to the vertical black border detection, the image frame has a height defined by a number of pixels. The image processor 282 should preferably detect whether the image frame includes potential top and/or bottom black borders, and if so, identify the height of the potential top and/or bottom black borders. The predetermined threshold value used for the sum of grey scale values should then be reduced to account for the height of the top and/or bottom black borders so that only the height of the image content is used for determination of this value.

Similarly, for the horizontal black border detection, the image frame has a width defined by a number of pixels. The image processor 282 should preferably detect whether the image frame includes potential left and/or right black borders, and if so, identify the width of the potential left and/or right black borders. The predetermined threshold value used for the sum of grey scale values should then be reduced to account for the width of the left and/or right black borders so that only the width of the image content is used for determination of this value.

Accordingly, in one preferred embodiment, Wx and Wy are computed as follows:

Wx=width of the image without black borders as computed in Step 1.

Wy=height of the image without black borders as computed in Step 1.

Alternatively, while less accurate, another preferred embodiment of the present invention does not factor in the black borders, and thus Wx and Wy are simply the respective width and height of the image frame, including any black borders that might be present. If the black borders are relatively small, the accuracy of the results will only be minimally impacted by ignoring any width or height adjustment due to the black borders. However, in an optimal embodiment, they should be accounted for, even if small.

To summarize, for edge image processing, the sum of the grey scale values for vertical black bar detection depends on the height of the image, and thus the threshold must be adjusted depending on the height of the image. When factoring in the presence of any horizontal black bars, the threshold must be further adjusted depending upon the height of the horizontal black bars.

Example: If the height of the edge image is 300 pixels, the sum of the grey scale values will be 300×255 (in a noiseless scenario), but if the height of the edge image is 500 pixels, the sum of the grey scale values will be 500×255 (in a noiseless scenario).

Example factoring in horizontal black bars: If the top and bottom black bars are 10 pixels each, then the image content portion is 280 pixels instead of 300 pixels, or 480 pixels instead of 500 pixels. Thus, the sum of grey scale values will be 280×255 and 480×255, respectively.

There are two ways to perform the threshold calculation which provide the same result. Consider an example wherein the total height is 300 pixels, including the top and bottom borders, and the top and bottom black borders are 10 pixels each. Thus, the image content portion is 280 pixels.

Methodology 1: Sum only the 280 pixels 11-290. The threshold is a function of the height (here, 280 pixels).

Methodology 2: Sum all 300 pixels, and select the threshold based on having 280 pixels. Select "0" values for pixels 1-10 and 291-300.

3. Rules Database

To further enhance the accuracy of the processes described above, rules database 284 may be used. The rules database 284 includes one or more rules that are tested to determine if potential black borders should not be detected as being an actual left or right black border because they violate one or more expected rules regarding black borders in video image frames. If none of the rules are violated, then the black borders remain as potential (likely) black borders.

Examples of such rules include the following:

i. A candidate left or right black border should not have a width that is more than a predetermined percentage (e.g., 20%) of the width of the image frame. Likewise, a candidate top or bottom black border should not have a height that is more than a predetermined percentage (e.g., 20%) of the height of the image frame.

ii. A candidate left or right black border should not have a width that is less than 2% of the width of the image frame. Likewise, a candidate top or bottom black border should not have a height that is less than 2% of the height of the image frame.

4. Edge Image Border

As described above, a candidate black border is deemed to be a potential black border when a peak on a graph of edge image sum of grey scale values crosses a threshold value at a location (row or column) that is very close to the candidate black border, such as within 3% of the image width or height.

Another way of expressing this relationship is to consider the first or last peak encountered in the graph as being a candidate edge image border. The candidate edge image border may then be compared to the candidate grey scale border, and if they are very close to each other, one can conclude that the candidate grey scale border is a potential black border. Consider the following example for finding a vertical border wherein the value for being very close to each other requires that the column identified as the candidate black border using the edge image must be within 2% of the column identified as the candidate black border using the grey scale image. That is, the rule is that the respective columns cannot be farther apart in value than 2% of the width of the image frame.

Example: Grey scale border=10th column of 300 column image

Edge image border=11th column of 300 column image (11−10)/300=0.33% which is not greater than 2%.

Result: Candidate black border identified using the grey scale image border is a potential black border for the left edge of the image.

Grey scale border=10th column of 300 column image

Edge image border=20th column of 300 column image (20−10)/300=3.3% which is greater than 2%.

Result: Candidate black border identified using the grey scale image border is NOT a potential black border for the left edge of the image.

5. Threshold Constant for Use in Threshold Value Calculation

In the examples above, 0.4 is used for the threshold constant. However, through trial and error, a value of 0.7 has been found to provide the most accurate results, and thus it is more preferred to use this higher value. The calculations described above, and the resultant values in the graphs of the figures would all be adjusted accordingly when using 0.7 instead of 0.4.

Preferred embodiments of the present invention may be implemented as methods, of which examples have been provided. The acts performed as part of the methods may be ordered in any suitable way. Accordingly, embodiments may be constructed in which acts are performed in an order different than illustrated, which may include performing some acts simultaneously, even though such acts are shown as being sequentially performed in illustrative embodiments.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

What is claimed is:

1. An automated method for detecting whether an image frame having image content therein includes a potential left or right black border, wherein the image frame is represented as a matrix of rows and columns of pixels, the columns having a leftmost column and a rightmost column, the potential left or right black borders each having a width, the image frame having an associated (i) grey scale image of the image frame, and (ii) edge image of the image frame, the method comprising:
- (a) automatically determining, using an image processor, a maximum grey scale value of the pixels in each column of the grey scale image of the image frame, the grey scale value ranging from a lowest value which represents black to a highest value which represents white;
- (b) detecting a candidate left black border on a leftmost edge of the grey scale image of the image frame, using the image processor, when a plurality of consecutive columns beginning with the leftmost column have a black maximum grey scale value, the width of the potential left black border being defined by the number of consecutive columns from the leftmost edge of the image frame that have a black maximum grey scale value;
- (c) detecting a candidate right black border on a rightmost edge of the grey scale image of the image frame, using the image processor, when a plurality of consecutive columns beginning with the rightmost column have a black maximum grey scale value, the width of the potential right black border being defined by the number of consecutive columns from the rightmost edge of the image frame that have a black maximum grey scale value;
- (d) automatically determining, using the image processor, a sum of grey scale values of the pixels in each column of the edge image of the image frame;
- (e) detecting a potential left black border on a leftmost edge of the image frame, using the image processor, when the sum of grey scale values for a column exceeds a predetermined threshold value and the column is located within a predefined percentage of the total image width from the candidate left black border; and
- (f) detecting a potential right black border on a rightmost edge of the image frame, using the image processor, when the sum of grey scale values for a column exceeds the predetermined threshold value and the column is located within a predefined percentage of the total image width from the candidate right black border.

2. The method of claim 1 further comprising:
- (g) providing a rules database of one or more rules regarding the image frame that indicates that a potential left or right black border should not be detected as being a left or right black border, and wherein steps (e) and (f) each further comprises detecting that the image frame includes a potential left or right black border when one or more of a potential left or right black border is detected, and when no rules in the rules database indicates that a potential left or right black border should not be detected as being a left or right black border.

3. The method of claim 2 wherein one of the rules in the rules database is that the potential left or right black border should not be detected as being a left or right black border when the
candidate left or right black border has a width that is more than a predetermined percentage of the width of the image frame.

4. The method of claim 2 wherein one of the rules in the rules database is that the potential left or right black border should not be detected as being a left or right black border when the candidate left or right black border has a width that is less than 2% of the width of the image frame.

5. The method of claim 1 wherein the image frame has a height defined by a number of pixels, the method further comprising:
- (g) detecting, using the image processor, whether the image frame includes potential top and/or bottom black borders, and if so, identifying the height of the potential top and/or bottom black borders,
  wherein the predetermined threshold value used in steps (e) and (f) is reduced to account for the height of the potential top and/or bottom black borders so that only the height of the image content is used for determination of the predetermined threshold value.

6. The method of claim 5 wherein the predetermined threshold value is 0.4×(height of the image frame−height of any horizontal black borders)×255.

7. The method of claim 1 wherein the predetermined threshold value is 0.4×height of the image frame×255.

8. The method of claim 1 wherein the predefined percentage of the total image width from the candidate left black border and right black border is one of either 2% or 3%.

9. An automated method for detecting whether an image frame having image content therein includes a potential top or bottom black border, wherein the image frame is represented as a matrix of rows and columns of pixels, the rows having a topmost row and a bottommost row, the potential top or bottom black borders each having a height, the image frame having an associated (i) grey scale image of the image frame, and (ii) edge image of the image frame, the method comprising:
- (a) automatically determining, using an image processor, a maximum grey scale value of the pixels in each row of the grey scale image of the image frame, the grey scale value ranging from a lowest value which represents black to a highest value which represents white;
- (b) detecting a candidate top black border on a topmost edge of the grey scale image of the image frame, using the image processor, when a plurality of consecutive rows beginning with the topmost row have a black maximum grey scale value, the height of the potential top black border being defined by the number of consecutive rows from the topmost edge of the image frame that have a black maximum grey scale value;
- (c) detecting a candidate bottom black border on a bottommost edge of the grey scale image of the image frame, using the image processor, when a plurality of consecutive rows beginning with the bottommost row have a black maximum grey scale value, the height of the potential bottom black border being defined by the number of consecutive rows from the bottommost edge of the image frame that have a black maximum grey scale value;
- (d) automatically determining, using the image processor, a sum of grey scale values of the pixels in each row of the edge image of the image frame;
- (e) detecting a potential top black border on a topmost edge of the image frame, using the image processor, when the sum of grey scale values for a row exceeds a predetermined threshold value and the row is located within a predefined percentage of the total image height from the candidate top black border; and
- (f) detecting a potential bottom black border on a bottommost edge of the image frame, using the image processor, when the sum of grey scale values for a row exceeds the predetermined threshold value and the row is located within a predefined percentage of the total image height from the candidate bottom black border.

10. The method of claim 9 further comprising:
(g) providing a rules database of one or more rules regarding the image frame that indicates that a potential top or bottom black border should not be detected as being a top or bottom black border, and wherein steps (e) and (f) each further comprises detecting that the image frame includes a potential top or bottom black border when one or more of a potential top or bottom black border is detected, and when no rules in the rules database indicates that a potential top or bottom black border should not be detected as being a top or bottom black border.

11. The method of claim 10 wherein one of the rules in the rules database is that the potential top or bottom black border should not be detected as being a top or bottom black border when the candidate top or bottom black border has a height that is more than a predetermined percentage of the height of the image frame.

12. The method of claim 10 wherein one of the rules in the rules database is that the potential top or bottom black border should not be detected as being a top or bottom black border when the candidate top or bottom black border has a height that is less than 2% of the height of the image frame.

13. The method of claim 9 wherein the image frame has a width defined by a number of pixels, the method further comprising:
(g) detecting, using the image processor, whether the image frame includes potential left and/or right black borders, and if so, identifying the width of the potential left and/or right black borders,
wherein the predetermined threshold value used in steps (e) and (f) is reduced to account for the width of the left and/or right black borders so that only the width of the image content is used for determination of the predetermined threshold value.

14. The method of claim 13 wherein the predetermined threshold value is 0.4×(width of the image frame−width of any vertical black borders)×255.

15. The method of claim 9 wherein the predetermined threshold value is 0.4×width of the image frame×255.

16. The method of claim 9 wherein the predefined percentage of the total image height from the candidate top black border and bottom black border is one of either 2% or 3%.

17. An apparatus for detecting whether an image frame having image content therein includes a potential left or right black border, wherein the image frame is represented as a matrix of rows and columns of pixels, the columns having a leftmost column and a rightmost column, the potential left or right black borders each having a width, the image frame having an associated (i) grey scale image of the image frame, and (ii) edge image of the image frame, the apparatus comprising an image processor configured to:
(a) determine a maximum grey scale value of the pixels in each column of the grey scale image of the image frame, the grey scale value ranging from a lowest value which represents black to a highest value which represents white;
(b) detect a candidate left black border on a leftmost edge of the grey scale image of the image frame when a plurality of consecutive columns beginning with the leftmost column have a black maximum grey scale value, the width of the potential left black border being defined by the number of consecutive columns from the leftmost edge of the image frame that have a black maximum grey scale value;
(c) detect a candidate right black border on a rightmost edge of the grey scale image of the image frame when a plurality of consecutive columns beginning with the rightmost column have a black maximum grey scale value, the width of the potential right black border being defined by the number of consecutive columns from the rightmost edge of the image frame that have a black maximum grey scale value;
(d) determine a sum of grey scale values of the pixels in each column of the edge image of the image frame;
(e) detect a potential left black border on a leftmost edge of the image frame when the sum of grey scale values for a column exceeds a predetermined threshold value and the column is located within a predefined percentage of the total image width from the candidate left black border; and
(f) detect a potential right black border on a rightmost edge of the image frame when the sum of grey scale values for a column exceeds the predetermined threshold value and the column is located within a predefined percentage of the total image width from the candidate right black border.

18. The apparatus of claim 17 further comprising a rules database of one or more rules regarding the image frame that indicates that a potential left or right black border should not be detected as being a left or right black border, and wherein the detection of a potential left black border and right black border each further comprises detecting that the image frame includes a potential left or right black border when one or more of a potential left or right black border is detected, and when no rules in the rules database indicates that a potential left or right black border should not be detected as being a left or right black border.

19. The apparatus of claim 18 wherein one of the rules in the rules database is that the potential left or right black border should not be detected as being a left or right black border when the candidate left or right black border has a width that is more than a predetermined percentage of the width of the image frame.

20. The apparatus of claim 18 wherein one of the rules in the rules database is that the potential left or right black border should not be detected as being a left or right black border when the candidate left or right black border has a width that is less than 2% of the width of the image frame.

21. The apparatus of claim 17 wherein the image frame has a height defined by a number of pixels, the image processor being further configured to:
(g) detect whether the image frame includes potential top and/or bottom black borders, and if so, identifying the height of the potential top and/or bottom black borders,
wherein the predetermined threshold value used in the detection of a potential left black border and right black border is reduced to account for the height of the potential top and/or bottom black borders so that only the height of the image content is used for determination of the predetermined threshold value.

22. The apparatus of claim 21 wherein the predetermined threshold value is 0.4×(height of the image frame−height of any horizontal black borders)×255.

23. The apparatus of claim 17 wherein the predetermined threshold value is 0.4×height of the image frame×255.

24. The apparatus of claim 17 wherein the predefined percentage of the total image width from the candidate left black border and right black border is one of either 2% or 3%.

25. An apparatus for detecting whether an image frame having image content therein includes a potential top or bottom black border, wherein the image frame is represented as a matrix of rows and columns of pixels, the rows having a topmost row and a bottommost row, the potential top or bottom black borders each having a height, the image frame having an associated (i) grey scale image of the image frame, and (ii) edge image of the image frame, the apparatus comprising an image processor configured to:
  (a) determine a maximum grey scale value of the pixels in each row of the grey scale image of the image frame, the grey scale value ranging from a lowest value which represents black to a highest value which represents white;
  (b) detect a candidate top black border on a topmost edge of the grey scale image of the image frame when a plurality of consecutive rows beginning with the topmost row have a black maximum grey scale value, the height of the potential top black border being defined by the number of consecutive rows from the topmost edge of the image frame that have a black maximum grey scale value;
  (c) detect a candidate bottom black border on a bottommost edge of the grey scale image of the image frame when a plurality of consecutive rows beginning with the bottommost row have a black maximum grey scale value, the height of the potential bottom black border being defined by the number of consecutive rows from the bottommost edge of the image frame that have a black maximum grey scale value;
  (d) determine a sum of grey scale values of the pixels in each row of the edge image of the image frame;
  (e) detect a potential top black border on a topmost edge of the image frame when the sum of grey scale values for a row exceeds a predetermined threshold value and the row is located within a predefined percentage of the total image height from the candidate top black border; and
  (f) detect a potential bottom black border on a bottommost edge of the image frame when the sum of grey scale values for a row exceeds the predetermined threshold value and the row is located within a predefined percentage of the total image height from the candidate bottom black border.

26. The apparatus of claim 25 further comprising a rules database of one or more rules regarding the image frame that indicates that a potential top or bottom black border should not be detected as being a top or bottom black border, and wherein the detection of a potential top black border and potential bottom black border each further comprises detecting that the image frame includes a potential top or bottom black border when one or more of a potential top or bottom black border is detected, and when no rules in the rules database indicates that a potential top or bottom black border should not be detected as being a top or bottom black border.

27. The apparatus of claim 26 wherein one of the rules in the rules database is that the potential top or bottom black border should not be detected as being a top or bottom black border when the candidate top or bottom black border has a height that is more than a predetermined percentage of the height of the image frame.

28. The apparatus of claim 26 wherein one of the rules in the rules database is that the potential top or bottom black border should not be detected as being a top or bottom black border when the candidate top or bottom black border has a height that is less than 2% of the height of the image frame.

29. The apparatus of claim 25 wherein the image frame has a width defined by a number of pixels, the image processor being further configured to:
  (g) detect using the image processor, whether the image frame includes potential left and/or right black borders, and if so, identifying the width of the potential left and/or right black borders,
    wherein the predetermined threshold value used in the detection of a potential top black border and bottom black border is reduced to account for the width of the left and/or right black borders so that only the width of the image content is used for determination of the predetermined threshold value.

30. The apparatus of claim 29 wherein the predetermined threshold value is 0.4×(width of the image frame−width of any vertical black borders)×255.

* * * * *